US012748518B2

(12) United States Patent
Li et al.

(10) Patent No.: US 12,748,518 B2
(45) **Date of Patent: *Sep. 29, 2026**

(54) TOUCH SUBSTRATE, DESIGN STRUCTURE OF TOUCH ELECTRODE LAYER, DISPLAY PANEL, AND DISPLAY DEVICE

(71) Applicants: Hefei BOE Ruisheng Technology Co., Ltd., Hefei (CN); BOE Technology Group Co., Ltd., Beijing (CN)

(72) Inventors: Baoran Li, Beijing (CN); Cheng Xu, Beijing (CN); Tao Wang, Beijing (CN); Jie Zhang, Beijing (CN); Zhi Zhang, Beijing (CN); Xiaodong Xie, Beijing (CN)

(73) Assignees: Hefei BOE Ruisheng Technology Co., Ltd., Hefei (CN); BOE Technology Group Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/192,029

(22) Filed: Apr. 28, 2025

(65) Prior Publication Data

US 2025/0258572 A1 Aug. 14, 2025

Related U.S. Application Data

(63) Continuation of application No. 18/697,439, filed as application No. PCT/CN2023/078068 on Feb. 24, 2023, now Pat. No. 12,314,524.

(51) Int. Cl.
*G06F 3/044* (2006.01)

(52) U.S. Cl.
CPC .. *G06F 3/0446* (2019.05); *G06F 2203/04112* (2013.01)

(58) Field of Classification Search
None
See application file for complete search history.

(56) References Cited

U.S. PATENT DOCUMENTS

2012/0080997 A1* 4/2012 Yamazaki et al. .... H01J 29/864 313/292

FOREIGN PATENT DOCUMENTS

CN 104637573 A * 5/2015

* cited by examiner

*Primary Examiner* — Nicholas J Lee
(74) *Attorney, Agent, or Firm* — IPro, PLLC

(57) ABSTRACT

The present application provides a touch substrate, a design structure of a touch electrode layer, a display panel, and a display device. The design structure of the touch electrode layer includes connecting portions and conducting wires. The connecting portions and the conducting wires form a plurality of meshes. One connecting portion is connected with four conducting wires. In conducting wires connected with a same connecting portion, at least one side edge of an end portion of at least one conducting wire connected with the connecting portion is provided with a notch, and a bottom of the notch joins an edge of the connecting portion. The touch electrode layer is prepared according to the design structure. The display panel includes the touch electrode layer. The display device includes the display panel.

20 Claims, 11 Drawing Sheets

TOUCH SUBSTRATE, DESIGN STRUCTURE OF TOUCH ELECTRODE LAYER, DISPLAY PANEL, AND DISPLAY DEVICE

TECHNICAL FIELD

The present application relates to the field of display technology, and in particular, to a touch substrate, a design structure of a touch electrode layer, a display panel, and a display device.

BACKGROUND

With the development of science and technology, electronic devices with a touch function have occupied most of markets of electronic devices. A touch film layer using a metal mesh structure has advantages of high touch accuracy, high touch sensitivity, etc., and is widely applied to electronic devices.

The used metal mesh structure is obtained by connecting a plurality of metal wires, and regions where adjacent metal wires are connected will shield some regions of sub-pixels located below the touch film layer. At present, an area of the regions where adjacent metal wires are connected in the touch film layer of electronic devices is relatively large, which may cause grey dots to appear when the electronic devices are displaying, affecting user experience.

SUMMARY

The present application provides a touch substrate, a design structure of a touch electrode layer, a display panel, and a display device.

According to a first aspect of the embodiments of the present application, there is provided a touch substrate, including a touch electrode layer, wherein the touch electrode layer is prepared using a design structure of the touch electrode layer of the touch substrate. The design structure includes connecting portions and conducting wires; the connecting portions and the conducting wires forming a plurality of meshes; each connecting portion of the connecting portions is connected with four conducting wires; in four conducting wires connected with a same connecting portion, at least one side edge of an end portion of at least one conducting wire and connected with the connecting portion is provided with a notch and an edge of the notch joins an edge of the connecting portion. The touch electrode layer includes touch connecting portions and touch traces; the touch connecting portions and the touch traces form a plurality of meshes and each touch connecting portion of the touch connecting portions is connected with four touch traces; in four touch traces connected with a same touch connecting portion, a width of an end portion of at least one touch trace connected with the touch connecting portion is smaller than a width of a part of the touch trace away from the touch connecting portion. The touch connecting portion includes opposite first edge and second edge, and opposite third edge and fourth edge, wherein a minimum distance between the first edge and the second edge is d1, and a minimum distance between the third edge and the fourth edge is d2. A maximum width of the touch traces is in a range of 4.2 μm to 4.6 μm, and a product of d1 and d2 is in a range of 90 $\mu m^2$ to 120 $\mu m^2$; or, the maximum width of the touch traces is in a range of 3.8 μm to 4.2 μm, and the product of d1 and d2 is in a range of 80 $\mu m^2$ to 110 $\mu m^2$; or, the maximum width of the touch traces is in a range of 3.4 μm to 3.8 μm, and the product of d1 and d2 is in a range of 65 $\mu m^2$ to 100 $\mu m^2$.

Optionally, each touch trace of the touch traces includes two first sub-touch traces and a second sub-touch trace between the two first sub-touch traces; the first sub-touch traces are connected with corresponding touch connecting portions. The touch traces include first touch traces and second touch traces, second sub-touch traces of the first touch traces extend along a third direction, and second sub-touch traces of the second touch traces extend along a fourth direction, wherein the third direction intersects with the fourth direction; in the four touch traces connected with the same touch connecting portion, two first touch traces and two second touch traces are alternately arranged along a circumference of the touch connecting portion. An angle between the third direction and the fourth direction is in a range of 66° to 70°.

Optionally, in a same touch trace, an extension direction of the first sub-touch traces is not colinear with an extension direction of the second sub-touch trace; an angle between extension directions of two adjacent first sub-touch traces connected with the same touch connecting portion is in a range of 80° to 90°.

Optionally, each touch trace of the touch traces further includes a bent portion between adjacent first sub-touch trace and second sub-touch trace, and both ends of the bent portion are connected respectively to the first sub-touch trace and the second sub-touch trace Optionally, a distance from an end portion of a first sub-touch trace connected with the second sub-touch trace to a center of the touch connecting portion is in a range of 15 μm to 40 μm.

Optionally, in a same touch trace, an extension direction of the first sub-touch traces is colinear with an extension direction of the second sub-touch trace.

Optionally, a maximum width of the touch traces is in a range of 2 μm to 6 μm.

According to a second aspect of the embodiments of the present application, there is provided a display panel including the above touch substrate and a light-emitting structure layer.

According to a third aspect of the embodiments of the present application, there is provided a display device including the above display panel and a housing configured to receive the display panel.

According to a fourth aspect of the embodiments of the present application, there is provided a design structure of a touch electrode layer of a touch substrate, including connecting portions and conducting wires; the connecting portions and the conducting wires forming a plurality of meshes. Each connecting portion of the connecting portions is connected with four conducting wires; in four conducting wires connected with a same connecting portion, at least one side edge of an end portion of at least one conducting wire and connected with the connecting portion is provided with a notch, and an edge of the notch joins an edge of the connecting portion. Each conducting wire of the conducting wires includes two first sub-conducting wires and a second sub-conducting wire between the two first sub-conducting wires; the first sub-conducting wires are connected with corresponding connecting portions. The conducting wires include first conducting wires and second conducting wires, second sub-conducting wires of the first conducting wires extend along a first direction, and second sub-conducting wires of the second conducting wires extend along a second direction. In the four conducting wires connected with the same connecting portion, two first conducting wires and two second conducting wires are alternately arranged along a circumference of the connecting portion. An angle between the first direction and the second direction is in a range of 66° to 70°.

Optionally, in a same conducting wire, an extension direction of the first sub-conducting wires is not colinear with an extension direction of the second sub-conducting wire, and a length of each of the first sub-conducting wires is smaller than that of the second sub-conducting wire; and an angle between extension directions of two adjacent first sub-conducting wires connected with the same connecting portion is in a range of 80° to 90°.

Optionally, a distance from an end portion of a first sub-conducting wire and connected with the second sub-conducting wire to a center of the connecting portion is in a range of 15 μm to 40 μm.

Optionally, each of the conducting wires further includes two bent connecting sections each between the second sub-conducting wire and one of the first sub-conducting wires, and both ends of each of the bent connecting sections are connected respectively with a corresponding first sub-conducting wire and the second sub-conducting wire.

Optionally, in a same conducting wire, an extension direction of the first sub-conducting wires is colinear with an extension direction of the second sub-conducting wire.

According to a fifth aspect of the embodiments of the present application, there is provided a design structure of a touch electrode layer of a touch substrate, including connecting portions and conducting wires; the connecting portions and the conducting wires forming a plurality of meshes. Each connecting portion of the connecting portions is connected with four conducting wires; in four conducting wires connected with a same connecting portion, at least one side edge of an end portion of at least one conducting wire and connected with the connecting portion is provided with a notch, and an edge of the notch joins an edge of the connecting portion. Each conducting wire of the conducting wires includes two first sub-conducting wires and a second sub-conducting wire between the two first sub-conducting wires; the first sub-conducting wires are connected with corresponding connecting portions. In first sub-conducting wires connected with the same connecting portion, adjacent side edges of two adjacent first sub-conducting wires are provided with a notch, and edges of two notches are connected respectively to a same edge of the connecting portion.

Optionally, each conducting wire of the conducting wires includes two first sub-conducting wires and a second sub-conducting wire between the two first sub-conducting wires; the first sub-conducting wires are connected with corresponding connecting portions. In the first sub-conducting wires connected with the same connecting portion, both adjacent side edges of two adjacent first sub-conducting wires are provided with a notch, edges of two notches intersect at a point, and the intersection point of the edges of the two notches coincides with a vertex of the connecting portion.

Optionally, each conducting wire of the conducting wires includes two first sub-conducting wires and a second sub-conducting wire between the two first sub-conducting wires; the first sub-conducting wires are connected with corresponding connecting portions. In the first sub-conducting wires connected with the same connecting portion, extension directions of any two adjacent first sub-conducting wires are perpendicular to each other. Only one side edge of each of the first sub-conducting wires is provided with a notch, or two side edges of each of the first sub-conducting wires are provided with a notch, and two opposite first sub-conducting wires are symmetrical about a center of the connecting portion.

Optionally, each conducting wire of the conducting wires includes two first sub-conducting wires and a second sub-conducting wire between the two first sub-conducting wires; the first sub-conducting wires are connected with corresponding connecting portions. In the first sub-conducting wires connected with the same connecting portion, at least two adjacent first sub-conducting wires are symmetrical about a symmetrical axis passing through a center of the connecting portion.

Optionally, a bottom of the notch is formed by two or more connected line segments.

Optionally, a maximum width of the conducting wires is in a range of 2 μm to 6 μm; and/or, a depth of the notch is in a range of 0.5 μm to 2 μm.

DETAILED DESCRIPTION

Figure 1:
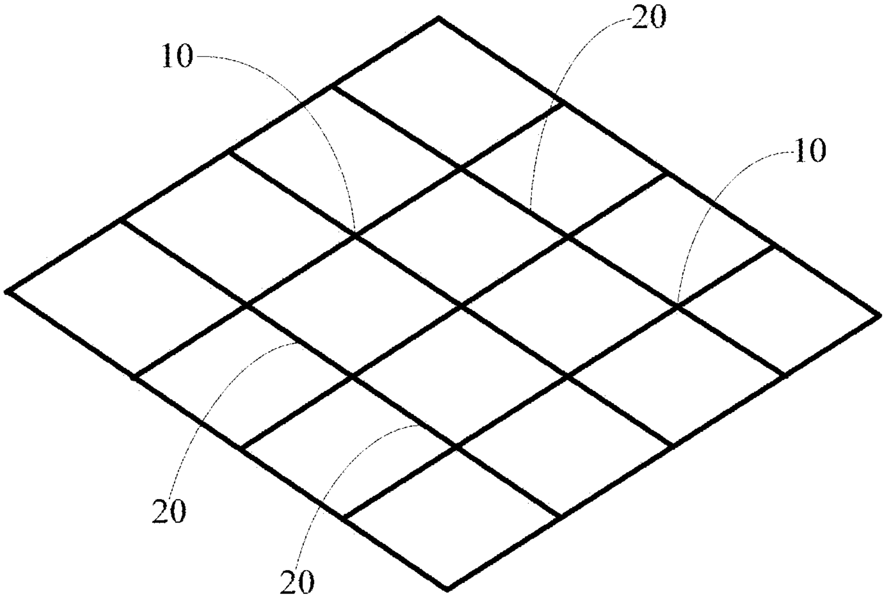
FIG. 1 is a schematic diagram illustrating a local structure of a design structure of a touch electrode layer provided according to an exemplary embodiment of the present application.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present application. Rather, they are merely examples of apparatuses and methods consistent with some aspects of the present application as detailed in the appended claims.

The terms used in the present application are for the purpose of describing particular examples only, and are not intended to limit the present application. Terms determined by "a", "the" and "said" in their singular forms in the present application and the appended claims are also intended to include plurality, unless clearly indicated otherwise in the context. It should also be understood that the term "and/or" as used herein refers to and includes any and all possible combinations of one or more of the associated listed items.

It is to be understood that, although terms "first," "second," "third," and the like may be used in the present application to describe various information, such information should not be limited to these terms. These terms are only used to distinguish one category of information from another. For example, without departing from the scope of the present application, first information may be referred as second information; and similarly, second information may also be referred as first information. Depending on the context, the word "if" as used herein may be interpreted as "when" or "upon" or "in response to determining".

Embodiments of the present application provide a touch substrate, a design structure of a touch electrode layer, a display panel, and a display device. The touch substrate, the design structure of the touch electrode layer, the display panel, and the display device in the embodiments of the present application will be described in detail below with reference to the accompanying drawings. In case of no conflict, features in the following embodiments may be supplemented or combined with each other.

One or more embodiments of the present application provide a design structure of a touch electrode layer of a touch substrate. The touch electrode layer of the touch substrate is prepared according to the design structure of the touch electrode layer. Specifically, during the preparation of the touch electrode layer, a metal layer and a photoresist film layer located on a side of the metal layer away from a base plate are first sequentially formed on the base plate, and orthographic projections of the metal layer and the photoresist film layer on the base plate may cover the base plate; subsequently, the photoresist film layer is exposed by using a mask plate as a shield, and then the photoresist film layer is developed to obtain a patterned photoresist film layer; finally, regions of the metal layer that are not covered by the photoresist film layer are etched through a wet etching process to obtain a patterned touch electrode layer. The pattern of the photoresist film layer is obtained according to the design structure of the touch electrode layer, and is roughly the same as the design structure of the touch electrode layer.

As shown in FIG. 1, the design structure of the touch electrode layer includes a plurality of connecting portions 10 and a plurality of conducting wires 20. The plurality of connecting portions 10 and the plurality of conducting wires 20 form a plurality of meshes/cells. The mesh of the touch electrode layer may be roughly in a diamond shape.

Figure 2:
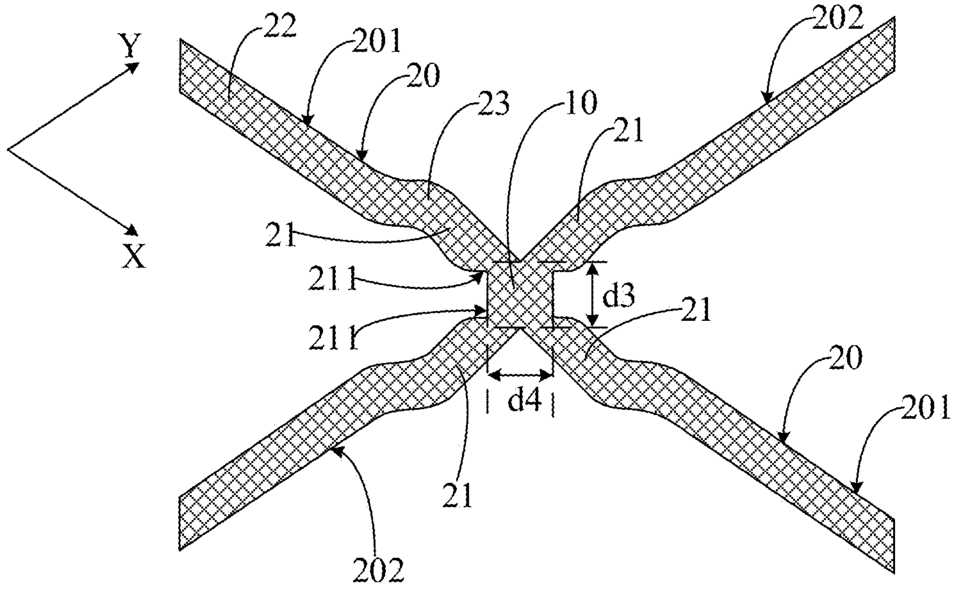
FIG. 2 is a schematic diagram illustrating a local structure of a design structure of a touch electrode layer provided according to an exemplary embodiment of the present application.

As shown in FIG. 2, one connecting portion 10 is connected with four conducting wires 20. In the conducting wires 20 connected with a same connecting portion 10, at least one side edge of an end portion of at least one conducting wire 20 and connected with the connecting portion 10 is provided with a notch 211, and a bottom edge of the notch 211 joins an edge of the connecting portion 10. That the bottom edge of the notch 211 joins the edge of the connecting portion 10 refers to that the bottom edge of the notch 211 is colinear with the edge of the connecting portion 10, or one point of the bottom edge of the notch 211 coincides with one vertex of the edge of the connecting portion 10.

The touch electrode layer prepared according to the design structure of the touch electrode layer includes a plurality of touch connecting portions and a plurality of touch traces, and one touch connecting portion is connected with four touch traces.

In the design structure of the touch electrode layer provided according to the embodiments of the present application, at least one side edge of an end portion of at least one conducting wire 20 and connected with the connecting portion 10 is provided with a notch 211, and a bottom edge of the notch 211 is connected with an edge of the connecting portion 10, that is, the notch 211 has no side edge on a side close to the connecting portion 10. If the side edge of the end portion of the conducting wire 20 and connected with the connecting portion 10 is not provided with the notch, or the end portion of the conducting wire 20 connected with the connecting portion 10 is provided with the notch but the bottom edge of the notch is not connected with the edge of the connecting portion 10, the end portion of the conducting wire 20 connected with the connecting portion 10 and the connecting portion 10 are a continuous conducting structure, which is equivalent to increasing an area of the connecting portion 10, so that an area of a touch connecting portion of the touch electrode layer prepared according to the design structure of the touch electrode layer is relatively large, which cannot effectively alleviate the phenomenon that grey dots appear when a touch substrate is displaying. With the design structure of the touch electrode layer provided in the embodiments of the present application, by providing at least one side edge of an end portion of at least one conducting wire and connected with the connecting portion 10 with a notch 211, and having a bottom edge of the notch 211 joined to an edge of the connecting portion 10, an area of a touch connecting portion of the touch electrode layer prepared according to the design structure can be reduced, which effectively alleviates the phenomenon that grey dots appear when a touch substrate is displaying, and improves user experience.

In an embodiment, as shown in FIG. 2, a conducting wire 20 includes two first sub-conducting wires 21 and a second sub-conducting wire 22 located between the two first sub-conducting wires 21. The first sub-conducting wires 21 join the connecting portions 10. The plurality of conducting wires 20 include a plurality of first conducting wires 201 and a plurality of second conducting wires 202. Second sub-conducting wires 22 of the plurality of first conducting wires 201 extend along a first direction X, and second sub-conducting wires 22 of the plurality of second conducting wires 202 extend along a second direction Y. In the conducting wires 20 connected with the same connecting portion 10, the first conducting wires 201 and the second conducting wires 202 are alternately arranged along a circumference of the connecting portion 10.

In an embodiment, an angle between the first direction X and the second direction Y is in a range of 66° ~70°; a distance between second sub-conducting wires 22 of two adjacent second conducting wires 202 arranged at an interval in the first direction X is in a range of 160 μm~170 μm; a distance between second sub-conducting wires 22 of two adjacent first conducting wires 201 arranged at an interval in the second direction Y is in a range of 160 μm~170 μm. When the design structure of the touch electrode layer satisfies the above parameters, the touch electrode layer prepared according to the design structure of the touch electrode layer satisfies the above parameters. The touch substrate further includes a light-emitting structure layer. In the process of light emitted from the light-emitting structure layer passing through the touch electrode layer and exiting in a direction away from the light-emitting structure layer, when the light passes through a regular mesh structure of the touch electrode layer, two types of sine waves with similar frequencies are generated. The two types of sine waves with similar frequencies, after being superimposed, form Moiré fringes. When the touch electrode layer satisfies the above parameters, the problem of Moiré fringes of the touch substrate can be alleviated, and the optical performance of the touch substrate can be improved In an embodiment, the angle between the first direction X and the second direction Y is, for example, 66°, 67°, 68°, 69° or 70°; the distance between second sub-conducting wires 22 of two adjacent second conducting wires 202 arranged at an interval in the first direction X is, for example, 160 μm, 162 μm, 164 μm, 166 μm, 168 μm or 170 μm; the distance between second sub-conducting wires 22 of two adjacent first conducting wires 201 arranged at an interval in the second direction Y is, for example, 160 μm, 162 μm, 164 μm, 166 μm, 168 μm or 170 μm.

In an embodiment, as shown in FIGS. 2 to 9, in the same conducting wire 20, an extension direction of the first sub-conducting wire 21 is not colinear with an extension direction of the second sub-conducting wire 22, and a length of the first sub-conducting wire 21 is smaller than that of the second sub-conducting wire 22. An angle between extension directions of two adjacent first sub-conducting wires 21 connected with the same connecting portion 10 is in a range of 80° to 90°. An angle between two straight lines refers to a smallest positive angle formed after intersection of the two straight lines, that is, the angle between the two straight lines is an acute angle or a right angle. After the photoresist film layer is exposed and developed, the photoresist film layer includes a plurality of strip structures and a pluralities of block structures. The strip structures correspond to the conducting wires 20, and the block structures correspond to the connecting portions 10. An angle between extension directions of adjacent strip structures is roughly equal to an angle between extension directions of two adjacent first sub-conducting wires 21. When an angle between two adjacent strip structures is constant, the greater a distance from a center of the block structure is, the longer a distance between the two adjacent strip structures is. When a distance between two adjacent strip structures is a constant value, the larger an angle between the two adjacent strip structures is, the shorter a distance from each position where the distance between the two strip structures is the constant value to a center of a block structure is. In theory, a minimum distance between adjacent strip structures is equal to a minimum process parameter of exposure process. However, due to existence of process deviations in the exposure process, the minimum distance between the adjacent strip structures is usually greater than the minimum process parameter of the exposure process. By setting an angle between extension directions of adjacent strip structures to be 80° ~90°, a distance from a center of a block structure to a position where a distance between two adjacent strip structures is a minimum distance can be relatively short. The minimum distance between two adjacent strip structures is a distance between end portions of the two adjacent strip structures connected with the connecting portion, that is, a distance between the center of the block structure and an edge of the block structure can be relatively short. Therefore, an area of the block structure can be reduced, and thus an area of a touch connecting portion of the prepared touch electrode layer is relatively small. The angle between the extension directions of two adjacent first sub-conducting wires 21 connected with the same connecting portion 10 may be, for example, 80°, 82°, 84°, 86°, 88° or 90°.

Preferably, the angle between the extension directions of two adjacent first sub-conducting wires 21 connected with the same connecting portion 10 is 90°. In this way, an area of a touch connecting portion of the prepared touch electrode layer can be smaller.

Further, a distance from an end portion of the first sub-conducting wire 21 connected with the second sub-conducting wire 22 to a center of the connecting portion 10 is in a range of 15 μm~40 μm. In this way, by setting the distance from the end portion of the first sub-conducting wire 21 connected with the second sub-conducting wire 22 to the center of the connecting portion 10 to be in this numerical range, it can be ensured that a notch 211 is formed on a side edge of the first sub-conducting wire 21, and it can be avoided that Moiré fringes are aggravated due to too large numerical value. The distance from the end portion of the first sub-conducting wire 21 connected with the second sub-conducting wire 22 to the center of the connecting portion 10 is, for example, 15 μm, 20 μm, 25 μm, 30 μm, 35 μm or 40 μm.

Further, as shown in FIGS. 2 to 9, the conducting wire 20 further includes a bent connecting section 23 located between the first sub-conducting wire 21 and the second sub-conducting wire 22, and both ends of the bent connecting section 23 are connected respectively to the first sub-conducting wire 21 and the second sub-conducting wire 22. Since the extension direction of the first sub-conducting wire 21 is different from the extension direction of the second sub-conducting wire 22, the first sub-conducting wire 21 is connected with the second sub-conducting wire 22 by disposing the bent connecting section 23, which implements a transition from the extension direction of the first sub-conducting wire 21 to the extension direction of the second sub-conducting wire 22.

In another embodiment, in the same conducting wire 20, the extension direction of the first sub-conducting wire 21 is colinear with the extension direction of the second sub-conducting wire 22. In this way, the extension direction of the first sub-conducting wire 21 is the same as the extension direction of the second sub-conducting wire 22, and in the prepared touch electrode layer, extension directions of respective sections of the same touch trace are basically same, which is more conducive to alleviating the problem of Moiré fringes and enhancing the optical performance of the touch substrate. In the embodiments shown in FIGS. 10 and 11, an angle between extension directions of adjacent first sub-conducting wires 21 is in a range of 66° to 70°, and in the same conducting wire 20, the extension direction of the first sub-conducting wire 21 may be colinear with the extension direction of the second sub-conducting wire 22.

Figure 3:
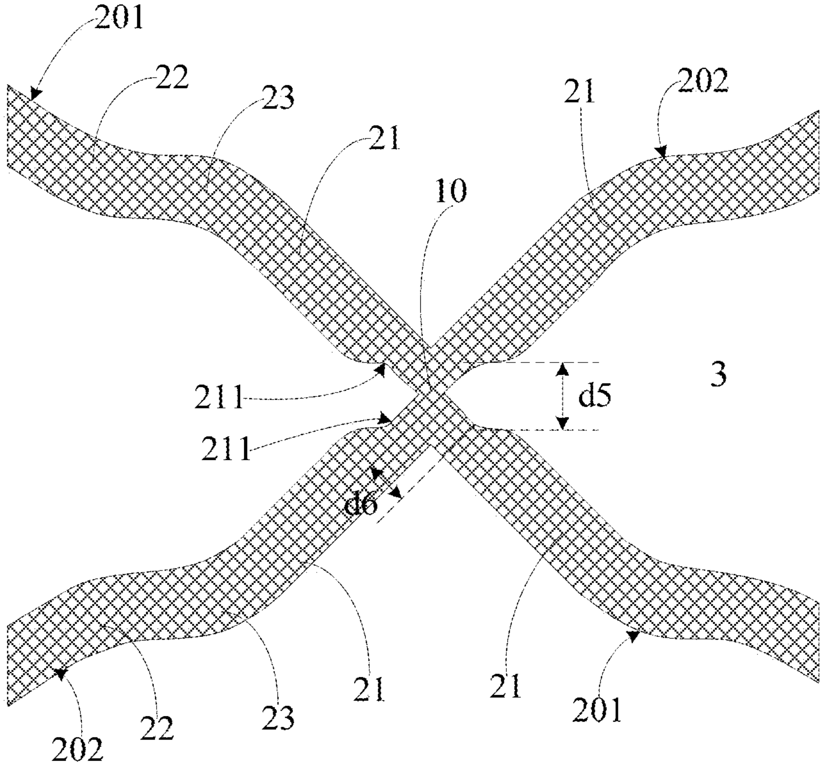
FIG. 3 is a schematic diagram illustrating a local structure of a design structure of a touch electrode layer provided according to another exemplary embodiment of the present application.
Figure 4:
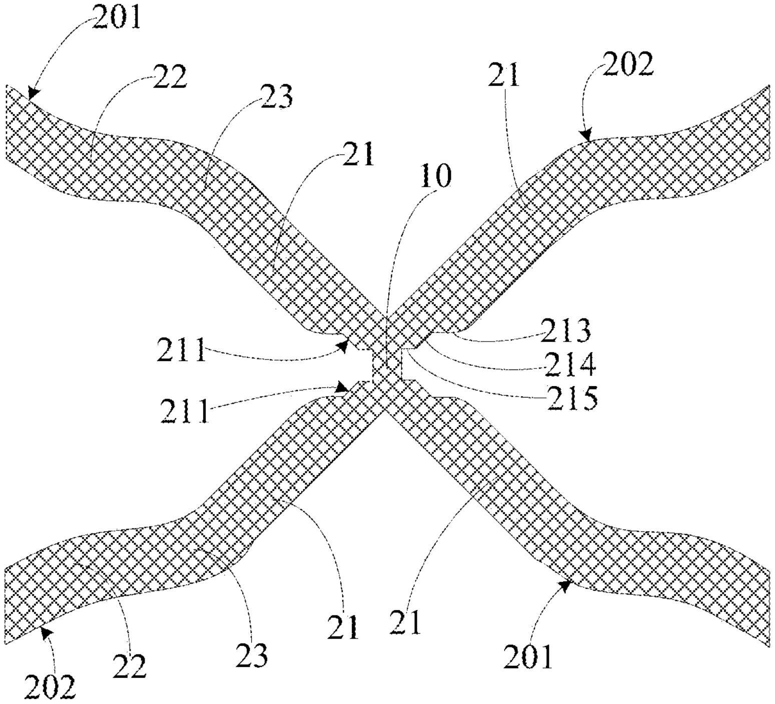
FIG. 4 is a schematic diagram illustrating a local structure of a design structure of a touch electrode layer provided according to another exemplary embodiment of the present application.

In an embodiment, as shown in FIGS. 2 to 6, 10 and 11, in first sub-conducting wires 21 connected with the same connecting portion 10, both adjacent side edges of two adjacent first sub-conducting wires 21 are provided with a notch 211, side edges of the two notches 211 are opposite, and a minimum distance between the side edges of the two notches 211 is greater than or equal to a minimum process parameter of the exposure process. In this way, when the photoresist film layer is exposed, notches may be formed respectively on adjacent side edges of two adjacent strip structures. The notch 211 of the first sub-conducting wire 21 may include a plurality of edges connected with each other, where an edge closest to the second sub-conducting wire 22 is a side edge of the notch, and remaining edges are bottom edges of the notch. As shown in FIG. 4, the notch 211 includes sequentially connected edges 213, 214 and 215, where the edge 213 closest to the second sub-conducting wire 22 is a side edge of the notch 211, and the edge 214 and the edge 215 are connected with form bottom edges of the notch 211.

Further, a difference between the minimum distance and the minimum process parameter of the exposure process is less than or equal to 1 μm. In this way, it can be avoided that a width of a touch trace in the touch electrode layer is too small, which causes the touch trace to break easily and affects the performance of the touch substrate.

In an embodiment, the minimum process parameter of the exposure process may be 6 μm. The minimum distance is in a range greater than or equal to 6 μm, and less than or equal to 7 μm.

Figure 7:
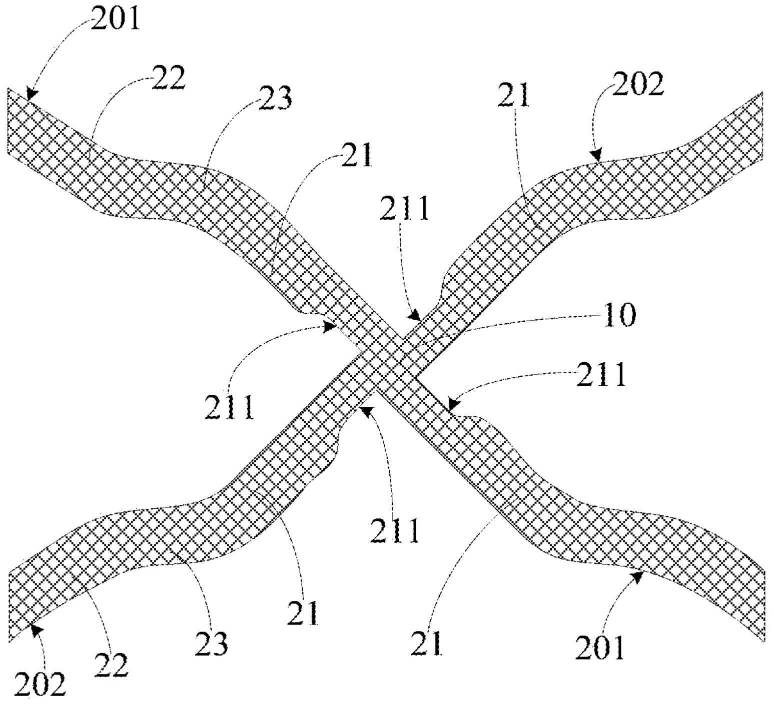
FIG. 7 is a schematic diagram illustrating a local structure of a design structure of a touch electrode layer provided according to another exemplary embodiment of the present application.

In an embodiment, as shown in FIG. 7, in first sub-conducting wires 21 connected with the same connecting portion 10, only one of adjacent side edges of two adjacent first sub-conducting wires 21 is provided with a notch 211, and a minimum length of the notch 211 is greater than or equal to a minimum process parameter of the exposure process. The length of the notch 211 refers to a size of the notch 211 in an extension direction of the first sub-conducting wire 21 where the notch 211 is located. In this way, when the photoresist film layer is exposed, the notch may be formed on one of adjacent side edges of two adjacent strip structures.

In an embodiment, as shown in FIGS. 2, 4, 8 to 11, in first sub-conducting wires 21 connected with the same connecting portion 10, both adjacent side edges of two adjacent first sub-conducting wires 21 are provided with a notch 211, and bottom edges of the two notches 211 are connected respectively to the same edge of the connecting portion 10. That is, at least parts of the bottom edges of the two notches 211 on the adjacent side edges of the two adjacent first sub-conducting wires 21 are located on a same straight line, or end points of the bottom edges of the two notches 211 on the adjacent side edges of the two adjacent first sub-conducting wires 21 are located on the same edge of the connecting portion 10.

In another embodiment, as shown in FIGS. 3, 5, 6, 8 and 9, in first sub-conducting wires 21 connected with the same connecting portion 10, both adjacent side edges of two adjacent first sub-conducting wires 21 are provided with a notch 211, bottom edges of the two notches 211 intersect at a point, and the intersection point of the bottom edges of the two notches 211 coincides with one vertex of the connecting portion 10.

Figure 8:
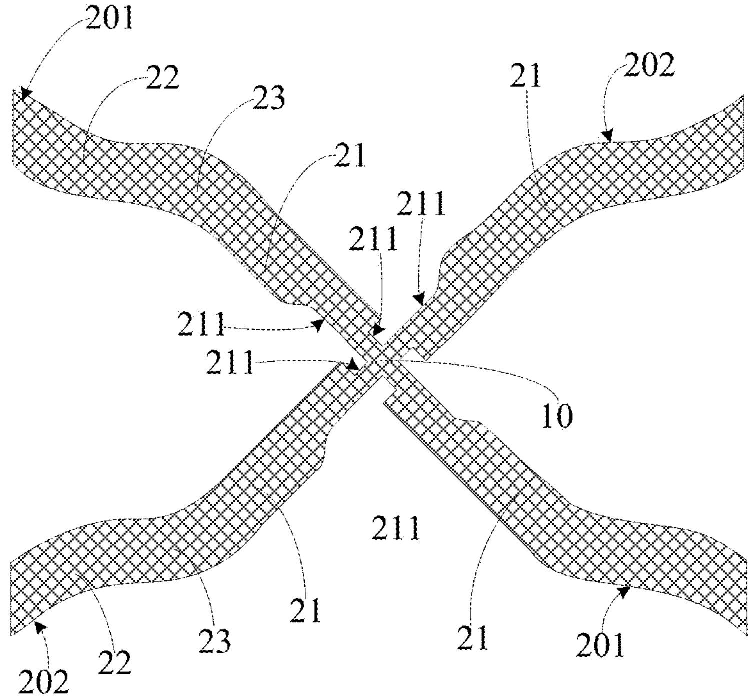
FIG. 8 is a schematic diagram illustrating a local structure of a design structure of a touch electrode layer provided according to another exemplary embodiment of the present application.
Figure 9:
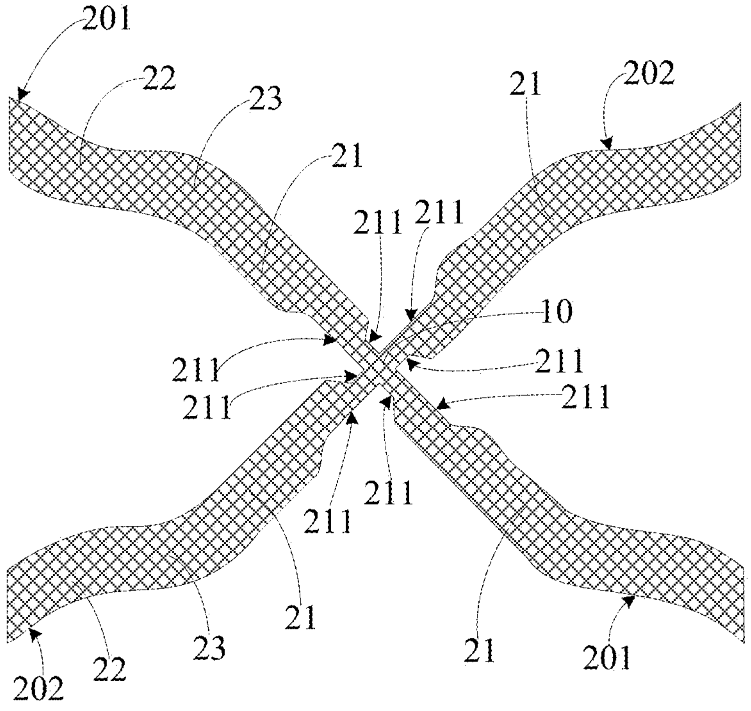
FIG. 9 is a schematic diagram illustrating a local structure of a design structure of a touch electrode layer provided according to another exemplary embodiment of the present application.

In an embodiment, as shown in FIGS. 7 to 9, in four first sub-conducting wires 21 connected with the same connecting portion 10, extension directions of any two adjacent first sub-conducting wires 21 are perpendicular to each other; only one side edge of each first sub-conducting wire 21 is provided with a notch 211, or two side edges of each first sub-conducting wire 21 are provided with a notch 211, and two opposite first sub-conducting wires 21 are symmetrical about a center of the connecting portion 10. That two first sub-conducting wires 21 are opposite refers to that the two first sub-conducting wires 21 are located on two opposite sides of the connecting portion 10. In the embodiment shown in FIG. 7, only one side edge of the first sub-conducting wire 21 is provided with a notch 211, and only one of adjacent side edges of two adjacent first sub-conducting wires 21 is provided with a notch 211. In the embodiments shown in FIGS. 8 and 9, both adjacent side edges of two adjacent first sub-conducting wires 21 are provided with a notch 211, and shapes of the notches 211 on the adjacent side edges of the two adjacent first sub-conducting wires 21 are different.

In another embodiment, as shown in FIGS. 2 to 6, 10 and 11, in four first sub-conducting wires 21 connected with the same connecting portion 10, at least two adjacent first sub-conducting wires 21 are symmetrical about a symmetrical axis passing through a center of the connecting portion 10. In the embodiments shown in FIGS. 2 to 6, 10 and 11, any two adjacent first sub-conducting wires 21 are symmetrical about a symmetrical axis passing through the center of the connecting portion 10.

Figure 5:
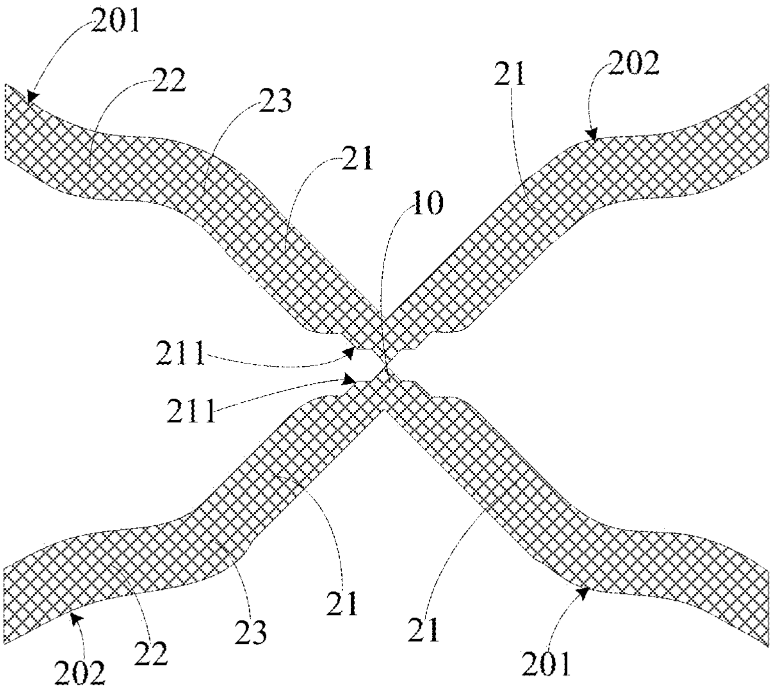
FIG. 5 is a schematic diagram illustrating a local structure of a design structure of a touch electrode layer provided according to another exemplary embodiment of the present application.

In an embodiment, as shown in FIGS. 4 and 5, a bottom edge of a notch 211 is formed by two or more connected line segments. In the embodiments shown in FIGS. 4 and 5, a bottom edge of a notch 211 is in a broken line shape. In the embodiment shown in FIG. 4, a bottom edge of a notch 211 is formed by two connected line segments. In the embodiment shown in FIG. 5, a bottom edge of a notch 211 is formed by three connected line segments.

In an embodiment, a depth of a notch 211 of a first sub-conducting wire 21 is in a range of 0.5 μm~2 μm. The depth of the notch 211 refers to a size of the notch 211 in a direction perpendicular to an extension direction of a first sub-conducting wire 21 where the notch 211 is located. In this way, it can be avoided not only that an area of the connecting portion 10 cannot be effectively reduced due to too small depth of the notch 211, but also that a minimum width of the first sub-conducting wire is too small due to too large depth of the notch 211, and further a minimum width of the prepared touch trace is too small, making the touch trace break easily. In some embodiments, the depth of the notch 211 is, for example, 0.5 μm, 1.0 μm, 1.5 μm or 2.0 μm.

In an embodiment, a maximum width of a conducting wire 20 is in a range of 2 μm~6 μm. It this way, it can be avoided not only that a touch trace of the prepared touch electrode layer breaks easily due to too small width of the conducting wire 20, but also that a width of the touch trace of the prepared touch electrode layer is large due to too large width of the conducting wire 20, and further Moiré fringes of the touch substrate are aggravated. The maximum width of the conducting wire 20 is, for example, 2 μm, 3 μm, 4 μm, 5 μm or 6 μm. A width of the second sub-conducting wires 22 and regions where the first sub-conducting wires 21 of the conducting wires 20 are not provided with a notch may be the maximum width, and when the conducting wire 20 includes a bent connecting section 23, a width of the bent connecting section 23 may also be the maximum width.

Further, the maximum width of the conducting wire 20 is in a range of 2 μm~4 μm. In this way, the phenomenon of Moiré fringes of the touch substrate can be more effectively alleviated.

In an embodiment, as shown in FIGS. 6 and 8 to 11, in first sub-conducting wires 21 connected with the same connecting portion 10, two opposite side edges of each first sub-conducting wire 21 are provided respectively with a notch 211. In this way, an area of the connecting portion 10 can be reduced to the greatest extent.

In an embodiment, a side edge of a notch 211 may be an arc or a line segment. In the embodiments shown in FIGS. 2 to 7, 10 and 11, side edges of notches 211 are arcs. In the embodiment shown in FIG. 8, side edges of some notches 211 are arcs, side edges of some notches 211 are line segments, and the line segments are perpendicular to extension directions of first sub-conducting wires 21 where the line segments are located. In the embodiment shown in FIG. 9, side edges of some notches 211 are arcs, side edges of some notches 211 are line segments, and the line segments intersect with extension directions of first sub-conducting wires 21 where the line segments are located.

Embodiments of the present application further provide a touch substrate. The touch substrate includes a touch electrode layer, and the touch electrode layer is prepared according to the design structure of the touch electrode layer described in any one of the above embodiments.

Figure 12:
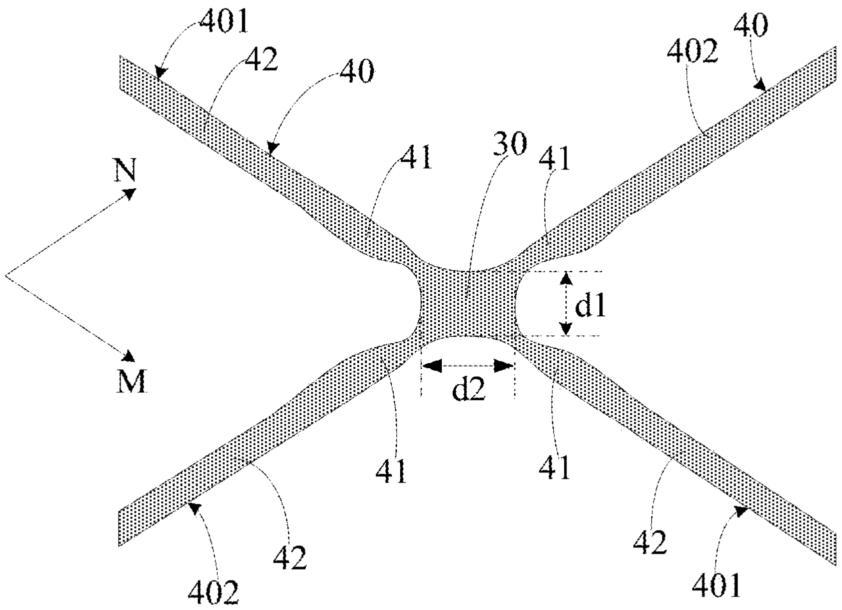
FIG. 12 is a schematic diagram illustrating a local structure of a touch electrode layer provided according to an exemplary embodiment of the present application.

The touch electrode layer includes a plurality of touch connecting portions and a plurality of touch traces. The plurality of touch connecting portions and the plurality of touch traces form a plurality of meshes/cells. The meshes of the touch electrode layer are roughly same as meshes of the design structure of the touch electrode layer. As shown in FIG. 12, one touch connecting portion 30 is connected with four touch traces 40; in the touch traces 40 connected with the same touch connecting portion 30, a width of an end portion of at least one touch trace 40 connected with the touch connecting portion 30 is smaller than a width of a region of the touch trace 40 away from the touch connecting portion 30.

The touch connecting portion 30 is roughly in a rectangular shape, and the touch connecting portion 30 includes opposite first edge and second edge, and opposite third edge and fourth edge, where a minimum distance between the first edge and the second edge is d1, and a minimum distance between the third edge and the fourth edge is d2. A maximum width of the touch trace 40 is in a range of 4.2 μm~4.6 μm, and a product of d1 and d2 is in a range of 90 $\mu m^2$~120 $\mu m^2$; or, the maximum width of the touch trace 40 is in a range of 3.8 μm~4.2 μm, and the product of d1 and d2 is in a range of 80 $\mu m^2$~110 $\mu m^2$; or, the maximum width of the touch trace 40 is in a range of 3.4 μm~3.8 μm, and the product of d1 and d2 is in a range of 65 $\mu m^2$~100 $\mu m^2$. At least parts of the first edge, the second edge, the third edge, and the fourth edge are located between two adjacent touch traces 40.

In the touch substrate provided in the embodiments of the present application, the touch electrode layer is prepared according to the design structure of the touch electrode layer described in the above embodiments. Since, in the design structure of the touch electrode layer, at least one side edge of an end portion of at least one conducting wire connected with the connecting portion is provided with a notch, a width of at least one touch trace connected with the touch connecting portion is smaller than a width of a region of the touch trace away from the touch connecting portion, and an area of the touch connecting portion of the touch electrode layer can be smaller, which is conducive to alleviating the problem that grey dots appear on the touch substrate.

In an embodiment, as shown in FIG. 12, the touch trace 40 includes two first sub-touch traces 41 and a second sub-touch trace 42 located between the two first sub-touch traces 41; the first sub-touch traces 41 are connected with the touch connecting portions 30.

In an embodiment, as shown in FIG. 12, the plurality of touch traces 40 include a plurality of first touch traces 401 and a plurality of second touch traces 402. Second sub-touch traces 42 of the first touch traces 401 extend along a third direction M, and second sub-touch traces 42 of the second touch traces 402 extend along a fourth direction N, where the third direction M intersects with the fourth direction N. In the touch traces 40 connected with the same touch connecting portion 30, the first touch traces 401 and the second touch traces 402 are alternately arranged along a circumference of the touch connecting portion 30.

In an embodiment, an angle between the third direction M and the fourth direction N is in a range of 66° to 70°; a distance between second sub-touch traces 42 of two adjacent second touch traces 402 arranged at an interval in the third direction M is in a range of 160 μm~170 μm; a distance between second sub-touch traces 42 of two adjacent first touch traces 401 arranged at an interval in the fourth direction N is in a range of 160 μm~170 μm. In this way, the problem of Moiré fringes of the touch substrate can be alleviated, and the optical performance of the touch substrate can be enhanced.

Figure 13:
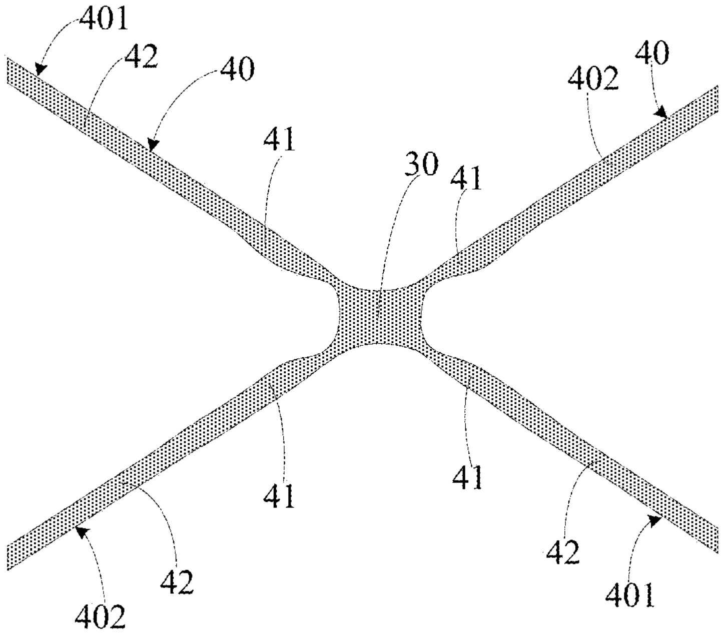
FIG. 13 is a schematic diagram illustrating a local structure of a touch electrode layer provided according to another exemplary embodiment of the present application.

In an embodiment, as shown in FIGS. 12 and 13, in the same touch trace 40, an extension direction of the first sub-touch trace 41 is colinear with an extension direction of the second sub-touch trace 42.

In another embodiment, as shown in FIGS. 14 to 20, in the same touch trace 40, an extension direction of the first sub-touch trace 41 is not colinear with an extension direction of the second sub-touch trace 42; an angle between extension directions of two adjacent first sub-touch traces 41 connected with the same touch connecting portion 30 is in a range of 80° to 90°.

Further, the touch trace 40 further includes a bent portion 43 located between adjacent first sub-touch trace 41 and second sub-touch trace 42, and both ends of the bent portion 43 are connected respectively to the first sub-touch trace 41 and the second sub-touch trace 42.

Further, a distance from an end portion of the first sub-touch trace 41 connected with the second sub-touch trace 42 to a center of the touch connecting portion 30 is in a range of 15 μm~40 μm.

In an embodiment, a maximum width of the touch trace 40 is in a range of 2 μm~6 μm.

In an embodiment, materials for the touch trace 40 may be metal, such as magnesium, silver, aluminium or copper. In other embodiments, materials for the touch trace 40 may be transparent conducting materials, such as indium tin oxide and indium zinc oxide.

Figure 10:
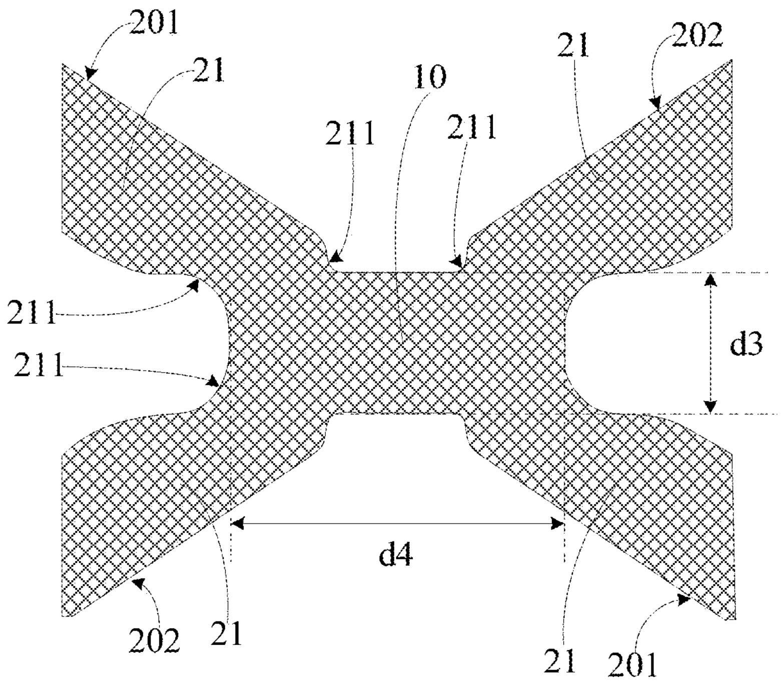
FIG. 10 is a schematic diagram illustrating a local structure of a design structure of a touch electrode layer provided according to another exemplary embodiment of the present application.

The touch electrode layer shown in FIG. 12 is prepared according to the design structure shown in FIG. 10. In the design structure shown in FIG. 10, the connecting portion 10 includes opposite first end and second end, and opposite third end and fourth end, where a minimum distance between the first end and the second end is d3, and a minimum distance between the third end and the fourth end is d4. When d3=6 μm and d4=6 μm, in a touch electrode layer of a touch substrate prepared according to the design structure shown in FIG. 10, a maximum width of a touch trace is 4.4 μm; in a touch connecting portion, d1=9 μm, d2=13.2 μm, and a product of d1 and d2 is 118.8 μm$^2$. When d3=6 μm and d4=6 μm, a plurality of touch electrode layers are prepared according to FIG. 10, and by implementing data statistics on an area of connecting portions of the plurality of touch electrode layers, it is known that a maximum width of a touch trace is 4.4 μm, and in the touch electrode layers prepared according to FIG. 10, a product of d1 and d2 is in a range of 110 μm$^2$~130 μm$^2$.

Figure 11:
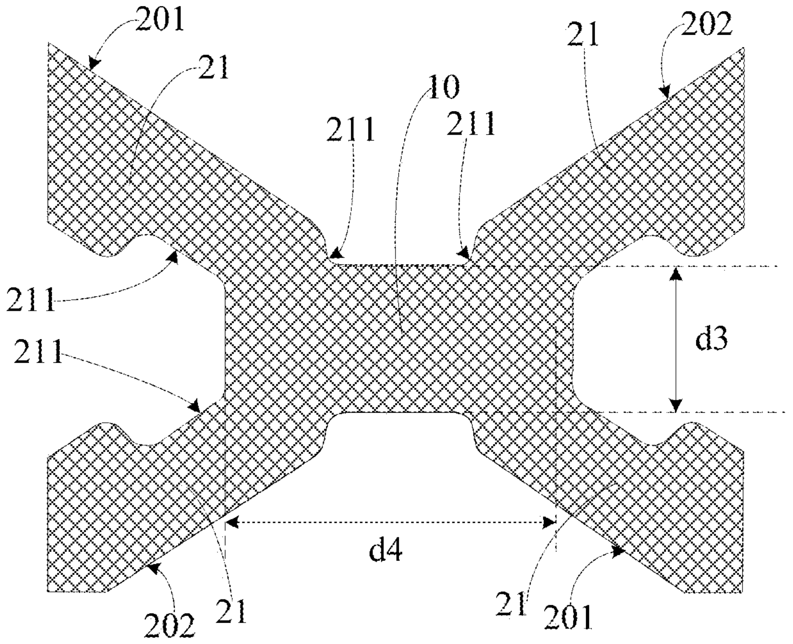
FIG. 11 is a schematic diagram illustrating a local structure of a design structure of a touch electrode layer provided according to another exemplary embodiment of the present application.

The touch electrode layer shown in FIG. 13 is prepared according to the design structure shown in FIG. 11. In the design structure shown in FIG. 11, the connecting portion 10 includes opposite first end and second end, and opposite third end and fourth end, where a minimum distance between the first end and the second end is d3, and a minimum distance between the third end and the fourth end is d4. When d3=6 μm and d4=6 μm, in a touch electrode layer of a touch substrate prepared according to the design structure shown in FIG. 11, a maximum width of a touch trace is 4.4 μm; in a touch connecting portion, d1=9 μm, d2=12.3 μm, and a product of d1 and d2 is 110.7 μm$^2$. When d3=6 μm and d4=6 μm, a plurality of touch electrode layers are prepared according to FIG. 11, a maximum width of a touch trace is 4.4 μm, and by implementing data statistics on an area of connecting portions of the plurality of touch electrode layers, it is known that, in the touch electrode layers prepared according to FIG. 11, a product of d1 and d2 is in a range of 100 μm$^2$~120 μm$^2$.

Figure 14:
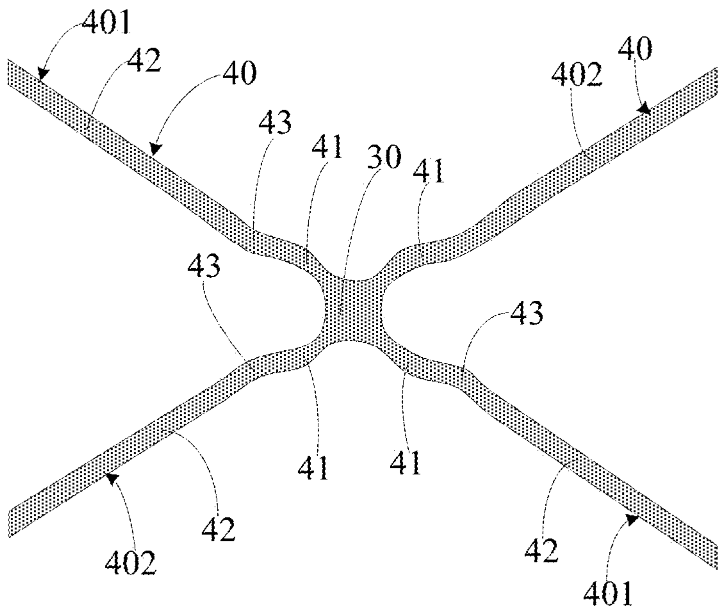
FIG. 14 is a schematic diagram illustrating a local structure of a touch electrode layer provided according to another exemplary embodiment of the present application.

The touch electrode layer shown in FIG. 14 is prepared according to the design structure shown in FIG. 2. In the design structure shown in FIG. 2, the connecting portion 10 includes opposite first end and second end, and opposite third end and fourth end, where a minimum distance between the first end and the second end is d3, and a minimum distance between the third end and the fourth end is d4. When d3=6 μm and d4=6 μm, in a touch electrode layer of a touch substrate prepared according to the design structure shown in FIG. 2, a maximum width of a touch trace is 4.4 μm; in a connecting portion, d1=9.8 μm, d2=11.8 μm, and a product of d1 and d2 is 115.6 μm$^2$. When d3=6 μm and d4=6 μm, a plurality of touch electrode layers are prepared according to FIG. 2, a maximum width of a touch trace is 4.4 μm, and by implementing data statistics on an area of connecting portions of the plurality of touch electrode layers, it is known that, a product of d1 and d2 is in a range of 100 μm$^2$~120 μm$^2$.

Figure 15:
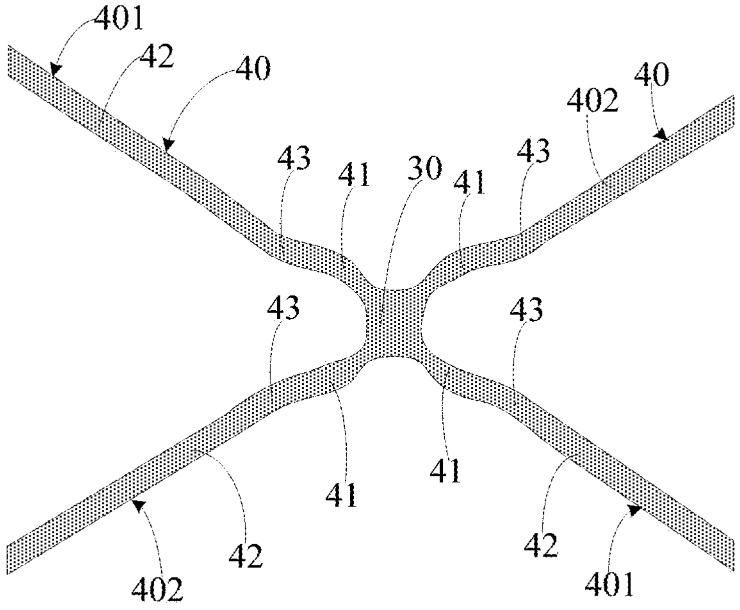
FIG. 15 is a schematic diagram illustrating a local structure of a touch electrode layer provided according to another exemplary embodiment of the present application.
Figure 16:
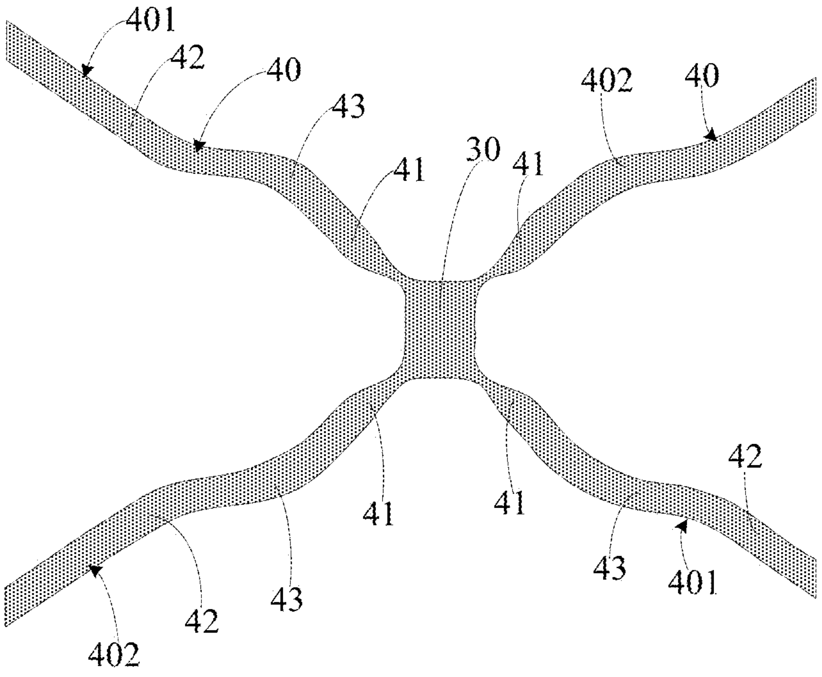
FIG. 16 is a schematic diagram illustrating a local structure of a touch electrode layer provided according to another exemplary embodiment of the present application.
Figure 17:
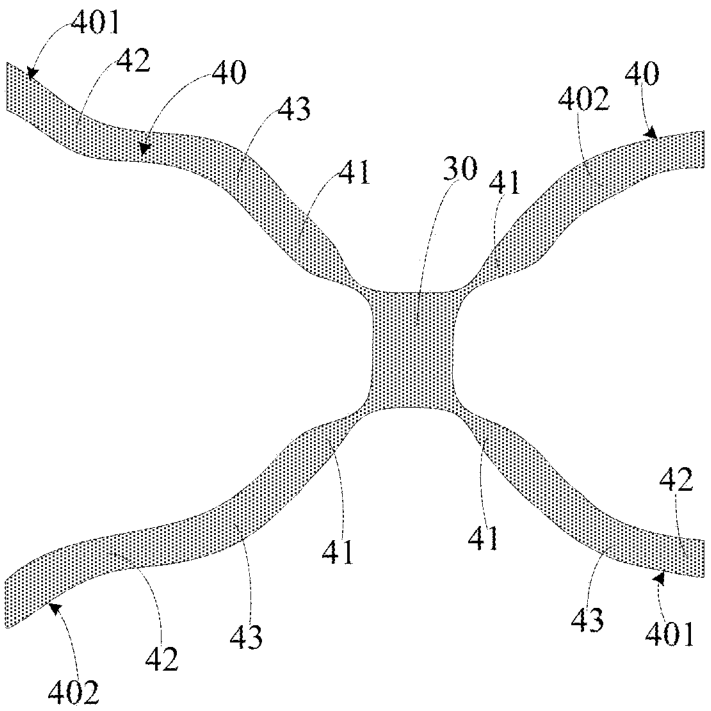
FIG. 17 is a schematic diagram illustrating a local structure of a touch electrode layer provided according to another exemplary embodiment of the present application.

The touch electrode layers shown in FIGS. 15, 16 and 17 are prepared according to the design structure shown in FIG. 3. In the design structure shown in FIG. 3, a distance between adjacent side edges of two adjacent notches 211 in the connecting portion 10 is d5, and a length of bottom edges of the notches 211 is d6. When d5=6 μm, and d6=6 μm, in a touch electrode layer of a touch substrate prepared according to the design structure shown in FIG. 3, a maximum width of a touch trace is 4.4 μm, a structure of the electrode layer of the touch substrate is shown in FIG. 15, and in a touch connecting portion, d1=8.5 μm, d2=11.4 μm, and a product of d1 and d2 is 96.9 μm$^2$; a maximum width of a touch trace is 4.0 μm, a structure of the electrode layer of the touch substrate is shown in FIG. 16, and in a touch connecting portion, d1=7.6 μm, d2=11.2 μm, and a product of d1 and d2 is 85.2 μm$^2$; a maximum width of a touch trace is 3.6 μm, a structure of the electrode layer of the touch substrate is shown in FIG. 17, and in a touch connecting portion, d1=7.1 μm, d2=10.7 μm, and a product of d1 and d2 is 75.9 μm$^2$. When d5=6 μm, and d6=6 μm, a plurality of touch electrode layers are prepared according to FIG. 3, and by implementing data statistics on an area of connecting portions of the plurality of touch electrode layers, it is known that a width of a touch trace is 4.4 μm, and a product of d1 and d2 is in a range of 90 μm$^2$~100 μm$^2$; a width of a touch trace is 4.0 μm, and a product of d1 and d2 is in a range of 80 μm$^2$~90 μm$^2$; a width of a touch trace is 3.6 μm, and a product of d1 and d2 is in a range of 65 μm$^2$~80 μm$^2$.

Figure 6:
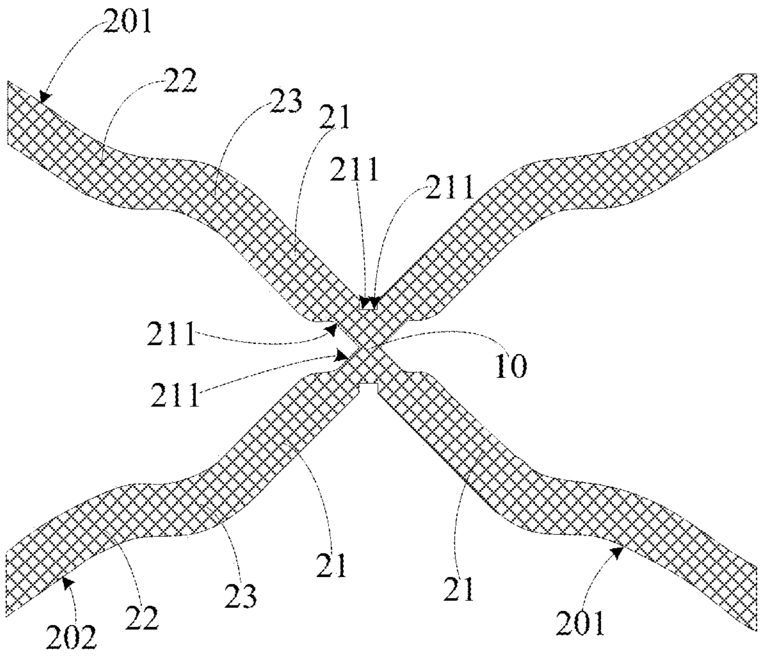
FIG. 6 is a schematic diagram illustrating a local structure of a design structure of a touch electrode layer provided according to another exemplary embodiment of the present application.

The touch electrode layers shown in FIGS. 14, 15 and 16 may also be prepared according to the design structures shown in FIGS. 4, 5 and 6.

Figure 18:
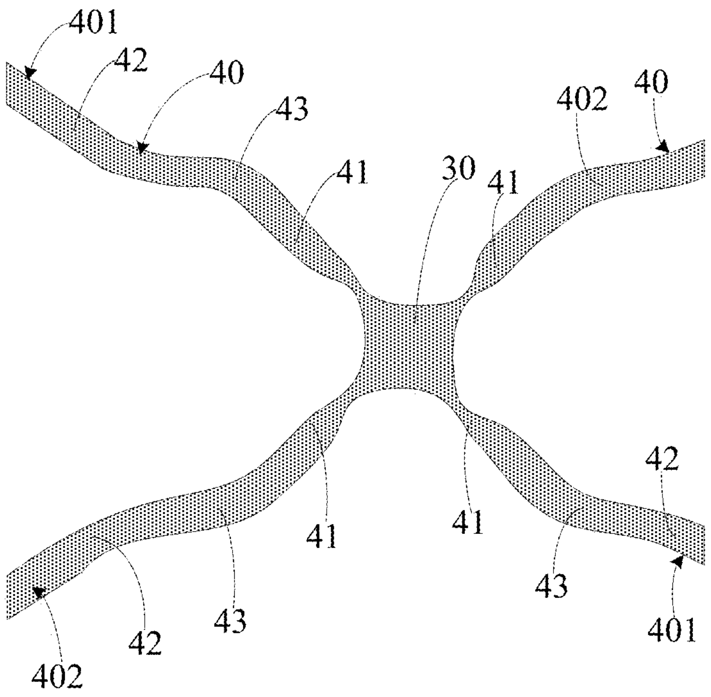
FIG. 18 is a schematic diagram illustrating a local structure of a touch electrode layer provided according to another exemplary embodiment of the present application.
Figure 19:
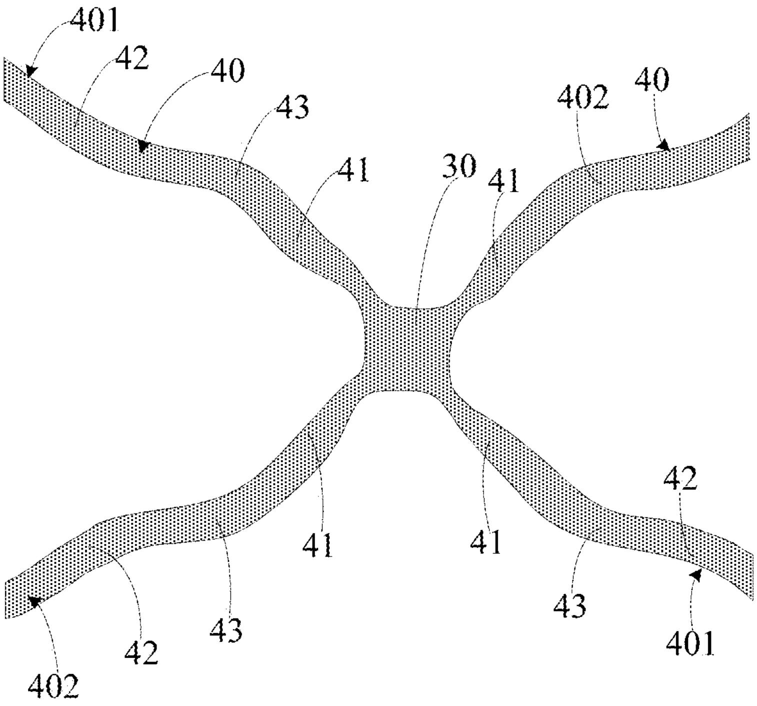
FIG. 19 is a schematic diagram illustrating a local structure of a touch electrode layer provided according to another exemplary embodiment of the present application.
Figure 20:
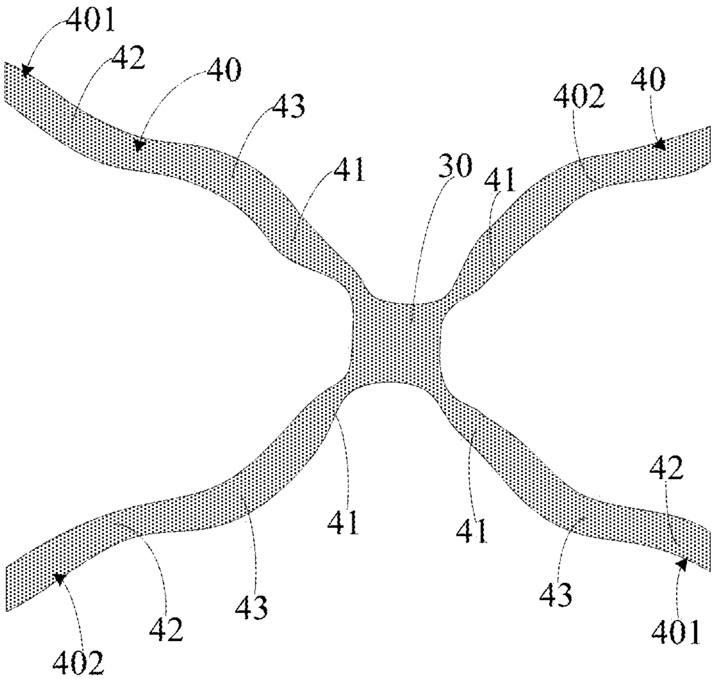
FIG. 20 is a schematic diagram illustrating a local structure of a touch electrode layer provided according to another exemplary embodiment of the present application.

The touch electrode layers shown in FIGS. 18, 19 and 20 are prepared according to the design structure shown in FIG. 7. When a width of a notch 211 is 6 μm, and a depth of the notch is 0.5 μm~2 μm, in the touch electrode layer prepared according to FIG. 7, a maximum width of a touch trace is 4.4 μm, a structure of the electrode layer of the touch substrate is shown in FIG. 18, and in a touch connecting portion, d1=10 μm, d2=9.5 μm, and a product of d1 and d2 is 95 μm$^2$; a maximum width of a touch trace is 4.0 μm, a structure of the electrode layer of the touch substrate is shown in FIG. 19, and in a touch connecting portion, d1=9.3 μm, d2=8.7 μm, and a product of d1 and d2 is 81.1 μm$^2$; a maximum width of a touch trace is 3.6 μm, a structure of the electrode layer of the touch substrate is shown in FIG. 20, and in a touch connecting portion, d1=9 μm, d2=8.7 μm, and a product of d1 and d2 is 78.3 μm$^2$. When a width of a notch 211 is 6 μm, and a depth of the notch is 0.5 μm~2 μm, a plurality of touch electrode layers are prepared according to FIG. 7, and by implementing data statistics on an area of touch connecting portions of the plurality of touch electrode layers, it is known that a width of a touch trace is 4.4 μm, and a product of d1 and d2 is in a range of 90 μm$^2$~100 μm$^2$; a width of a touch trace is 4.0 μm, and a product of d1 and d2 is in a range of 80 μm$^2$~90 μm$^2$; a width of a touch trace is 3.6 μm, and a product of d1 and d2 is in a range of 65 μm$^2$~80 μm$^2$.

The touch electrode layers shown in FIGS. 18, 19 and 20 may also be prepared according to the design structures shown in FIGS. 8 and 9.

Embodiments of the present application further provide a display panel. The display panel includes a touch substrate described in any one of the above embodiments.

Figure 21:
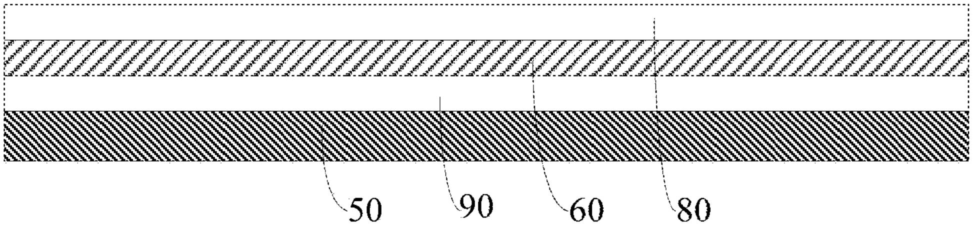
FIG. 21 is a schematic diagram illustrating a structure of a display panel provided according to an exemplary embodiment of the present application.

As shown in FIG. 21, the display panel further includes a light-emitting structure layer 50 and a color filter layer 60 located on a side of the light-emitting structure layer 50, and the touch electrode layer 80 is located on a side of the color filter layer 60 away from the light-emitting structure layer 50. The light-emitting structure layer 50 may include an anode layer, a cathode layer, and an organic light-emitting material layer located between the anode layer and the cathode layer.

In another embodiment, the display panel further includes a light-emitting structure layer 50 and a polarizer located on a side of the light-emitting structure layer 50, and the touch electrode layer 80 is located on a side of the polarizer away from the light-emitting structure layer 50.

In an embodiment, as shown in FIG. 21, the display panel further includes an encapsulation layer 90, and the encapsulation layer 90 may be disposed between a light-emitting structure layer 50 and a color filter layer 60. The encapsulation layer 90 may be a thin film encapsulation layer, including alternately stacked organic layer and inorganic layer, and a film layer farthest from the light-emitting structure layer 50 is the inorganic layer. Alternatively, the encapsulation layer 90 may be a glass encapsulation layer. When the display panel includes a polarizer, the encapsulation layer 90 may be located between the polarizer and the light-emitting structure layer 50.

Embodiments of the present application further provide a display device. The display device includes a display panel as described above.

In an embodiment, the display device further includes a housing, and the display panel is embedded in the housing.

The display device provided in the embodiments of the present application can be any suitable display device, including, but not limited to, any product or component with a display function, such as a mobile phone, a tablet computer, a television, a monitor, a notebook computer, a digital photo frame, a navigator, or an e-book.

It should be pointed out that in the drawings, sizes of layers and regions may be exaggerated for clarity of illustration. It will also be understood that, when an element or layer is referred to as being "on" another element or layer, it can be directly on other element, or an intermediate layer may be present. In addition, it will be understood that, when an element or layer is referred to as being "below" another element or layer, it can be directly below other element, or more than one intermediate layer or element may be present. It will also be understood that, when a layer or element is referred to as being "between" two layers or elements, it can be the only layer between the two layers or elements, or more than one intermediate layer or element may be present. Similar reference signs indicate similar elements throughout.

Other embodiments of the present application will be readily apparent to those skilled in the art after considering the specification and practicing the contents disclosed herein. The present application is intended to cover any variations, uses, or adaptations of the present application, which follow the general principle of the present application and include common knowledge or conventional technical means in the art that are not disclosed in the present application. The specification and examples are to be regarded as illustrative only. The true scope and spirit of the present application are pointed out by the following claims.

It is to be understood that the present application is not limited to the precise structures that have described and shown in the drawings, and various modifications and changes can be made without departing from the scope thereof. The scope of the application is to be limited only by the appended claims.

The invention claimed is:

1. A touch substrate, comprising a touch electrode layer, wherein the touch electrode layer comprises touch connecting portions and touch traces; the touch connecting portions and the touch traces form meshes and each touch connecting portion of the touch connecting portions is connected with four touch traces of the touch traces; among four touch traces connected with a same touch connecting portion of the touch connecting portion, a width of an end portion of at least one touch trace connected with the touch connecting portion is smaller than a width elsewhere of the touch trace;

wherein the touch connecting portions each comprises opposite first edge and second edge, and opposite third edge and fourth edge, wherein a minimum distance between the first edge and the second edge is d1, and a minimum distance between the third edge and the fourth edge is d2;

wherein a maximum width among widths of the touch traces is in a range of 4.2 μm to 4.6 μm, and a product of d1 and d2 is in a range of 90 $\mu m^2$ to 120 $\mu m^2$; or, the maximum width among the widths of the touch traces is in a range of 3.8 μm to 4.2 μm, and the product of d1 and d2 is in a range of 80 $\mu m^2$ to 110 $\mu m^2$; or, the maximum width among the widths of the touch traces is in a range of 3.4 μm to 3.8 μm, and the product of d1 and d2 is in a range of 65 $\mu m^2$ to 100 $\mu m^2$.

2. The touch substrate according to claim 1, wherein each touch trace of the touch traces comprises two first sub-touch traces and a second sub-touch trace between the two first sub-touch traces; the first sub-touch traces are connected with adjacent touch connecting portions of the touch connecting portions;

wherein the touch traces comprise first touch traces and second touch traces, second sub-touch traces of the first touch traces extend along a third direction, and second sub-touch traces of the second touch traces extend along a fourth direction, wherein the third direction intersects with the fourth direction; in the four touch traces connected with the same touch connecting portion among the touch connecting portions, two first touch traces and two second touch traces are alternately arranged along a circumference of the touch connecting portion;

wherein an angle between the third direction and the fourth direction is in a range of 66° to 70°.

3. The touch substrate according to claim 2, wherein in a same touch trace among the touch traces, an extension direction either of the first sub-touch traces is not colinear with an extension direction of the second sub-touch trace;

wherein an angle between extension directions of two adjacent first sub-touch traces connected with the same touch connecting portion is in a range of 80° to 90°.

4. The touch substrate according to claim 3, wherein each touch trace of the touch traces further comprises a bent portion between adjacent first sub-touch trace and second sub-touch trace of the each touch trace, and both ends of the bent portion are connected respectively to the first sub-touch trace and the second sub-touch trace.

5. The touch substrate according to claim 3, wherein a distance from an end portion of each of the first sub-touch traces and connected with the second sub-touch trace to a center of the touch connecting portion is in a range of 15 μm to 40 μm.

6. The touch substrate according to claim 2, wherein in a same touch trace among the touch traces, an extension direction of the first sub-touch traces is colinear with an extension direction of the second sub-touch trace.

7. The touch substrate according to claim 1, wherein a maximum width among widths of the touch traces is in a range of 2 μm to 6 μm.

8. A display panel, comprising the touch substrate according to claim 1 and a light-emitting structure layer.

9. A display device, comprising the display panel according to claim 8 and a housing configured to receive the display panel.

10. A design structure, comprising connecting portions and conducting wires; the connecting portions and the conducting wires forming a plurality of meshes;

wherein each connecting portion of the connecting portions is connected with four conducting wires of the conducting wires; among four conducting wires connected with a same connecting portion of the connecting portions, at least one side edge of an end portion of at least one conducting wire among the four conducting wires and connected with the connecting portion comprises a notch, and an edge of the notch joins an edge of the connecting portion;

wherein each conducting wire of the conducting wires comprises two first sub-conducting wires and a second sub-conducting wire between the two first sub-conducting wires; the first sub-conducting wires are connected with adjacent connecting portions;

wherein the conducting wires comprise first conducting wires and second conducting wires, the second sub-conducting wires of the first conducting wires extend along a first direction, and second sub-conducting wires of the second conducting wires extend along a second direction;

wherein in the four conducting wires connected with the same connecting portion, two first conducting wires and two second conducting wires are alternately arranged along a circumference of the connecting portion;

wherein an angle between the first direction and the second direction is in a range of 66° to 70°.

11. The design structure according to claim 10, wherein in a same conducting wire among the conducting wires, an extension direction of either of the first sub-conducting wires is not colinear with an extension direction of the second sub-conducting wire, and a length of each of the first sub-conducting wires is smaller than that of the second sub-conducting wire; and an angle between extension directions of two adjacent first sub-conducting wires connected with the same connecting portion is in a range of 80° to 90°.

12. The design structure according to claim 11, wherein a distance from an end portion of each of the first sub-conducting wires and connected with an adjacent second sub-conducting wire to a center of the connecting portion is in a range of 15 μm to 40 μm.

13. The design structure according to claim 11, wherein each of the conducting wires further comprises two bent connecting sections each between the second sub-conducting wire and one of the first sub-conducting wires, and both ends of each of the bent connecting sections are connected respectively with a corresponding first sub-conducting wire and the second sub-conducting wire.

14. The design structure according to claim 11, wherein in a same conducting wire among the conducting wires, an extension direction of the first sub-conducting wires is colinear with an extension direction of the second sub-conducting wire.

15. A design structure of a touch electrode layer of a touch substrate, comprising connecting portions and conducting wires; the connecting portions and the conducting wires forming a plurality of meshes;

wherein each connecting portion of the connecting portions is connected with four conducting wires of the conducting wires; among four conducting wires connected with a same connecting portion of the connecting portions, at least one side edge of an end portion of at least one conducting wire among the four conducting wires and connected with the connecting portion comprises a notch, and an edge of the notch joins an edge of the connecting portion;

wherein each conducting wire of the conducting wires comprises two first sub-conducting wires and a second sub-conducting wire between the two first sub-conducting wires; the first sub-conducting wires are connected with adjacent connecting portions;

wherein in first sub-conducting wires connected with the same connecting portion, adjacent side edges of two adjacent first sub-conducting wires are provided with a notch, and edges of two notches are connected respectively to a same edge of the connecting portion.

16. The design structure according to claim 15, wherein each conducting wire of the conducting wires comprises two first sub-conducting wires and a second sub-conducting wire between the two first sub-conducting wires; the first sub-conducting wires are connected with adjacent connecting portions;

wherein in the first sub-conducting wires connected with the same connecting portion, both adjacent side edges of two adjacent first sub-conducting wires are provided with a notch, edges of two notches intersect at a point, and the intersection point of the edges of the two notches coincides with a vertex of the connecting portion.

17. The design structure according to claim 15, wherein each conducting wire of the conducting wires comprises two first sub-conducting wires and a second sub-conducting wire between the two first sub-conducting wires; the first sub-conducting wires are connected with adjacent connecting portions;

wherein in the first sub-conducting wires connected with the same connecting portion, extension directions of any two adjacent first sub-conducting wires are perpendicular to each other;

wherein only one side edge of each of the first sub-conducting wires is provided with a notch, or two side edges of each of the first sub-conducting wires are provided with a notch, and two opposite first sub-conducting wires are symmetrical about a center of the connecting portion.

18. The design structure according to claim 15, wherein each conducting wire of the conducting wires comprises two first sub-conducting wires and a second sub-conducting wire between the two first sub-conducting wires; the first sub-conducting wires are connected with adjacent connecting portions;

wherein in the first sub-conducting wires connected with the same connecting portion, at least two adjacent first sub-conducting wires are symmetrical about a symmetrical axis passing through a center of the connecting portion.

19. The design structure according to claim 15, wherein a bottom of the notch is formed by two or more connected line segments.

20. The design structure according to claim 15, wherein a maximum width among widths of the conducting wires is in a range of 2 μm to 6 μm; and/or, a depth of the notch is in a range of 0.5 μm to 2 μm.

* * * * *